(12) United States Patent
Chin et al.

(10) Patent No.: US 6,576,740 B1
(45) Date of Patent: Jun. 10, 2003

(54) METHOD OF TERMINATING OXYMETHYLENE POLYMERIZATION

(75) Inventors: Chong-Won Chin, Kyungki-do (KR); Young-Heup Kim, Ulsan (KR); Kyung-Seob Byun, Ulsan (KR)

(73) Assignee: Korea Engineering Plastics Co., Ltd. (KR)

( * ) Notice: Subject to any disclaimer, the term of this patent is extended or adjusted under 35 U.S.C. 154(b) by 0 days.

(21) Appl. No.: 10/031,124

(22) PCT Filed: Nov. 24, 1999

(86) PCT No.: PCT/KR99/00707
§ 371 (c)(1), (2), (4) Date: Jan. 9, 2002

(87) PCT Pub. No.: WO01/04171
PCT Pub. Date: Jan. 18, 2001

(30) Foreign Application Priority Data

Jul. 9, 1999 (KR) .......................................... 1999/27652

(51) Int. Cl.⁷ .................................................. C08F 6/00
(52) U.S. Cl. ........................ 528/480; 525/405; 525/410; 525/440; 525/472
(58) Field of Search .................. 528/480; 525/405, 525/410, 440, 472

(56) References Cited

U.S. PATENT DOCUMENTS 2,989,509 A  *  6/1961  Hudgin et al. ............... 528/492
4,356,071 A  * 10/1982  Fenton ........................ 528/232

* cited by examiner

Primary Examiner—Terressa M. Boykin
(74) Attorney, Agent, or Firm—Anderson Kill & Olick, PC

(57) ABSTRACT

A polyoxymethylene having enhanced thermal stability and resistance to depolymerization is obtained by using an alkylated melamine compound of formula (1) as a polymerization terminating agent in a polymerization of formaldehyde or a cyclic oligomer thereof and an optional comonomer in the presence of an acid catalyst:

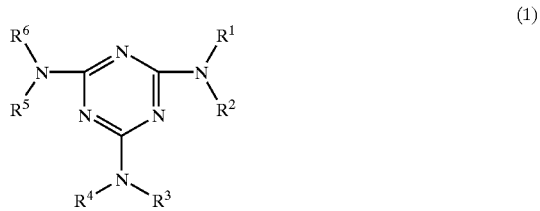

(1)

wherein, $R^1$ to $R^6$ are each independently H, $C_{1-4}$ alkyl or $CH_2OR^7$; $R^7$ is H, $C_{1-4}$ alkyl or $R^8COOR^9$; $R^8$ is $—(CH_2)_n—$, n being an integer of 1 to 4; and $R^9$ is $C_{1-4}$ alkyl.

5 Claims, No Drawings

METHOD OF TERMINATING OXYMETHYLENE POLYMERIZATION

CROSS REFEREMCE TO RELATED APPLICATION

This application is a continuation application of International Application No. PCT/KR99/00707, filed on Nov. 24, 1999 while designating the United States of America.

FIELD OF THE INVENTION

The present invention relates to an improved method of terminating the reaction for the preparation of a polyoxymethylene resin, by way of using a specified alkylated melamine as a polymerization-terminating agent.

BACKGROUND OF THE INVENTION

Polyoxymethylene resins have been widely used in various applications owing to their good mechanical, chemical, physical and electrical properties, and they are generally prepared by polymerizing formaldehyde or a cyclic oligomer thereof such as trioxane, optionally along with an alkylene oxide or a cyclic formal as a comonomer, in the presence of an acidic polymerization catalyst.

After the completion of the polymerization reaction, it is required to terminate the polymerization reaction by deactivating the polymerization catalyst. Otherwise, a product having poor thermal stability results due to the occurrence of a depolymerization reaction.

Many attempts have been made to effectively deactivate polymerization catalysts used in the preparation of polyoxymethylene resins. For example, U.S. Pat. No. 2,989,509 discloses the use of an aliphatic amine and a heterocyclic amine as a deactivating agent. However, this method has the disadvantage that an additional step of removing the amine compound is required when a long-term stability of the resin is desired.

Further, Japanese Unexamined Patent Publication No. (sho)62-267311 describes a method of deactivating the polymerization catalyst by adding a hindered amine of formula (A):

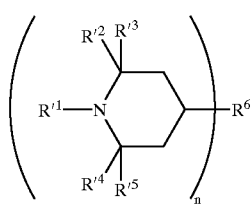

(A)

wherein,
$R'^1$ is H or a $C_{1-30}$ monofunctional organic residue,
$R'^2$ to $R'^5$ are each independently $C_{1-5}$ alkyl,
n is an integer of 1 or higher,
$R'^6$ is an n-functional organic residue.

However, the above method has problems in that the hindered amine has limited reactivity with the polymerization catalyst and the polymer obtained thereby has poor thermal stability.

Accordingly, there has existed a need to develop a method of more effectively deactivating a polymerization catalyst used in the preparation of a polyoxymethylene resin.

SUMMARY OF THE INVENTION

It is, therefore, an object of the present invention to provide an improved method of terminating the oxymethylene polymerization reaction to obtain a polyoxymethylene resin having improved properties.

In accordance with one aspect of the present invention, there is provided a method of terminating the polymerization reaction for the preparation of a polyoxymethylene resin, which comprises adding an alkylated melamine compound of formula (1) to a polymerization product obtained by polymerizing formaldehyde or a cyclic oligomer thereof and an optional comonomer in the presence of an acid catalyst:

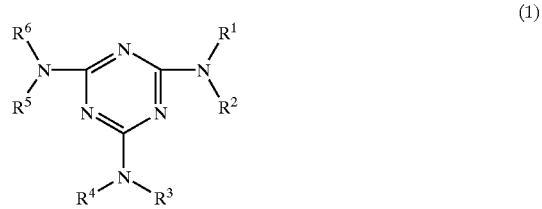

(1)

wherein,
$R^1$ to $R^6$ are each independently H, $C_{1-4}$ alkyl or $CH_2OR^7$; $R^7$ is H, $C_{1-4}$ alkyl or $R^8COOR^9$; $R^8$ is —$(CH_2)_n$—, n being an integer of 1 to 4; and $R^9$ is $C_{1-4}$ alkyl.

DETAILED DESCRIPTION OF THE INVENTION

The present invention is characterized by the use of the alkylated melamine compound of formula (1) as a catalyst-deactivating agent in the polymerization reaction product for the preparation of a polyoxymethylene resin.

The polyoxymethylene resin, which may be produced in accordance with the present invention, is an oxymethylene homopolymer having an oxymethylene repeating unit of formula (2); an oxymethylene-oxyalkylene copolymer having the oxymethylene repeating unit and an oxyalkylene repeating unit of formula (3); or a mixture thereof:

(2)

(3)

wherein,
y is an integer of 2 to 6, and
$X_1$ and $X_2$ are each independently hydrogen, or an alkyl or aryl group.

The polyoxymethylene resin may preferably have a number average molecular weight ranging from 10,000 to 200,000, a melting point of 150° C. or higher, and a degree of crystallinity of 65 to 85%.

The oxymethylene homopolymer may be prepared by polymerizing formaldehyde or a cyclic oligomer thereof such as trioxane; and the oxymethylene-oxyalkylene copolymer may be prepared by randomly polymerizing formaldehyde or a cyclic oligomer thereof with an alkylene oxide or a cyclic formal in the presence of a Lewis acid catalyst.

In the preparation of the oxymethylene-oxyalkylene copolymer, representative examples of the alkylene oxide include ethylene oxide, propylene oxide, butylene oxide and phenylene oxide, with ethylene oxide being preferred. Further, representative cyclic formals include 1,3-dioxolane, diethyleneglycolformal, 1,3-propanediolformal, 1,4-butanediolformal, 1,3-dioxepaneformal and 1,3,6-trioxocane, with 1,3-dioxolane and 1,4-butanediolformal being preferred.

The oxymethylene-oxyalkylene copolymer may preferably contain at least two carbon atoms bonded in the main chain, and have a molar ratio of the oxyalkylene repeating unit to the oxymethylene repeating unit ranging from 1:0.05 to 1:50, preferably 1:0.1 to 1:20.

In accordance with the present invention, the polymerization step of the polyoxymethylene resin is preferably conducted in the presence of a boron trifluoride-based catalyst such as $BF_3.OH_2$, $BF_3.OEt_2$, $BF_3.OBu_2$, $BF_3.CH_3COOH$, $BF_3.PF_5.HF$ and $BF_3$-10-hydroxyacetphenol. Preferred catalyst are $BF_3.OEt_2$ and $BF_3.OBu_2$. The catalyst may be employed in an amount ranging from $2\times10^{-6}$ to $2\times10^{-2}$ mol per mole of monomer.

Further, the polymerization may be carried out at a temperature ranging from 0 to 100° C., preferably from 20 to 80° C., in a bulk-, suspension- or solution-polymerization process.

Further, in the polymerization of an oxymethylene polymer, a chain transferring agent such as an alkylated phenol or alkylated ether may be conventionally employed. Preferred chain transferring agent is an alkylated ether such as dimethoxymethane.

In accordance with the present invention, the alkylated melamine compound of formula (1) is added to the polymerization reaction product as a catalyst-deactivating agent. The alkylated melamine compound may be employed as is or in the form of a solution. Exemplary organic solvents useful for dissolving the alkylated melamine may include aromatic hydrocarbons such as benzene, toluene and xylene; aliphatic hydrocarbons such as n-hexane, n-heptane and cyclohexane; alcohols such as methanol and ethanol; halogenated hydrocarbons such as chloroform, dichloromethane and 1,2-dichloroethane; and ketones such as acetone and methylethyl ketone.

The alkylated melamine may be employed in an amount sufficient to neutralize the acid catalyst used in the polymerization reaction and in case a boron trifluoride-based catalyst is used, the alkylated melamine may be employed in an amount ranging from 0.2 to 50 moles per mole of the catalyst. When the amount of the catalyst-deactivating agent is lower than 0.2 mole, the thermal stability of the obtained polymer becomes poor, while when the amount is greater than 50 moles, a polymer having inferior properties is obtained.

After the termination of the polymerization reaction, the polyoxymethylene product may be stabilized by capping the terminal groups thereof by esterification or etherification. An oxymethylene-oxyethylene copolymer may be stabilized by removing unstable end-oxymethylene groups to obtain a stabilized copolymer having $-(CX_1X_2)_yOH$ end groups in a conventional manner.

EXAMPLES

The following Examples are intended to illustrate the present invention more specifically, without limiting the scope of the invention.

In the Examples and Comparative Examples, the physical properties of the obtained polymer were evaluated in accordance with the following methods.

1. Percentage of Weight Reduction

A weighed polymer sample was treated under a vacuum of 10 mmHg and 220 to 224° C. for 30 minutes, and weighed again. The percentage of weight reduction of the polymer sample was calculated to evaluate the thermal stability of the polymer.

2. Melt Index

The melt index of a polymer sample was measured by extruding the polymer through an orifice having a given inner diameter at 190° C. and a loading of 2.16 kg. A high melt index value means that the polymer is depolymerized in a high level.

3. Amount of Formaldehyde Generated

A 2 g polymer sample was heated to about 222° C. under a nitrogen flow, and the gas generated was swept with the nitrogen flow into an ice-water trap. The ice-water was then analyzed for the amount of formaldehyde with an UV spectrophotometer. The amount of formaldehyde generated provides another measure of thermal stability of the polymer.

Example 1

In a 600 ml polymerization reactor maintained at 50° C., 500 g of trioxane and 12.5 g of ethylene oxide as a comonomer were introduced using an injector, and 0.06 g (78 ppm based on the amount of trioxane employed) of $BF_3.O(Et)_2$ as a polymerization catalyst was added thereto. 15 Minutes after the addition of the polymerization catalyst, a solution of 0.170 g (the same amount as the molar amount of the catalyst employed) of CYMEL303 (marketed by CYTEC, a compound of formula (1) wherein $R^1$ to $R^6$ are $-CH_2OCH_3$) dissolved in 1.7 g of benzene, as a catalyst deactivating agent. The reaction was completed 10 minutes thereafter to obtain an oxymethylene copolymer.

Examples 2 to 5

The procedure of Example 1 was repeated except that CYMEL 303 was added in an amount of 0.002 g, 0.009 g, 0.085 g, and 0.848 g, respectively, to obtain oxymethylene copolymers.

Example 6

The procedure of Example 1 was repeated except that 20.0 g of 1,3-dioxolane was employed in place of ethylene oxide, to obtain an oxymethylene copolymer.

Example 7

The procedure of Example 1 was repeated except that 0.152 g (a molar equivalent amount to the catalyst employed) of CYMEL380 (marketed by CYTEC, a compound of formula (1) wherein $R^1$, $R^3$ and $R^5$ are $-CH_2OCH_3$, and $R^2$, $R^4$ and $R^6$ are $-CH_2OH$) was employed as a catalyst deactivating agent, to obtain an oxymethylene copolymer.

Example 8

The procedure of Example 1 was repeated except that 0.225 g (a molar equivalent amount to the catalyst employed) of CYMEL1135 (marketed by CYTEC, a compound of formula (1) wherein $R^1$, $R^3$ and $R^5$ are $-CH_2OCH_3$, and $R^2$, $R^4$ and $R^6$ are $-CH_2O(CH_2)_3CH_3$) was employed as a catalyst deactivating agent, to obtain an oxymethylene copolymer.

Example 9

The procedure of Example 8 was repeated except that 20.0 g of 1,3-dioxolane was employed in place of ethylene oxide, to obtain an oxymethylene copolymer.

Comparative Example 1

The procedure of Example 1 was repeated except that a catalyst deactivating agent was not employed, to obtain an oxymethylene copolymer.

Comparative Example 2

The procedure of Example 1 was repeated except that 0.014 g (five times the molar amount of the catalyst employed) of triethylamine was employed in place of CYMEL303 as a catalyst deactivating agent, to obtain an oxymethylene copolymer.

Comparative Example 3

The procedure of Comparative Example 2 was repeated except that triethylamine was employed in an amount of 0.170 g (sixty times the molar amount of the catalyst employed), to obtain an oxymethylene copolymer.

Comparative Example 4

The procedure of Example 1 was repeated except that 1.105 g (five times the molar amount of the catalyst employed) of TINUVIN765 (a hindered amine marketed by Cibe-Geigy, bis-1,2,2,6,6-pentamethyl-4-piperidylsebacate) was employed in place of CYMEL303 as a catalyst deactivating agent, to obtain an oxymethylene copolymer.

Comparative Example 5

The procedure of Comparative Example 4 was repeated except that TINUVIN was employed in an amount of 0.213 g (a molar equivalent amount to the catalyst employed), to obtain an oxymethylene copolymer.

The oxymethylene copolymers obtained in Examples and Comparative Examples were tested according to the above-mentioned methods, the test results are shown in Table 1.

What is claimed is:

1. A method of terminating the polymerization reaction for the preparation of a polyoxymethylene resin, which comprises adding an alkylated melamine compound of formula (1) to a polymerization product obtained by polymerizing formaldehyde or a cyclic oligomer thereof and an optional comonomer in the presence of an acid catalyst:

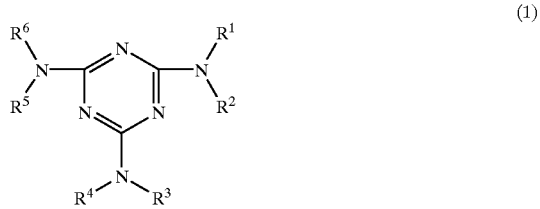

wherein, $R^1$ to $R^6$ are each independently H, $C_{1-4}$ alkyl or $CH_2OR^7$; $R^7$ is H, $C_{1-4}$ alkyl or $R^8COOR^9$; $R^8$ is —$(CH_2)_n$—, n being an integer of 1 to 4; and $R^9$ is $C_{1-4}$ alkyl.

2. The method of claim 1, wherein the acid catalyst is selected from the group consisting of $BF_3.OH_2$, $BF_3.OEt_2$, $BF_3.OBu_2$, $BF_3.CH_3COOH$, $BF_3.PF_5.HF$ and $BF_3$-10-hydroxyacetphenol.

TABLE 1

| | Co-monomer | Catalyst-Deactivating agent Component | Catalyst-Deactivating agent Amount* | Weight Reduction Percentage (%) | Melt Index (g/10 min.) | Amount of HCHO generated (ppm) |
|---|---|---|---|---|---|---|
| Ex. | | | | | | |
| 1 | Ethylene oxide | CYMEL303 | 1.0 | 4.0 | 9.5 | 650 |
| 2 | Ethylene oxide | CYMEL303 | 0.012 | 5.0 | 10.1 | 800 |
| 3 | Ethylene oxide | CYMEL303 | 0.053 | 4.5 | 9.8 | 750 |
| 4 | Ethylene oxide | CYMEL303 | 0.5 | 4.0 | 9.5 | 700 |
| 5 | Ethylene oxide | CYMEL303 | 5.0 | 4.0 | 9.5 | 600 |
| 6 | 1,3-Dioxolane | CYMEL303 | 1.0 | 4.0 | 9.5 | 620 |
| 7 | Ethylene oxide | CYMEL380 | 1.0 | 4.0 | 9.5 | 700 |
| 8 | Ethylene oxide | CYMEL1135 | 1.0 | 4.0 | 9.5 | 650 |
| 9 | 1,3-Dioxolane | CYMEL1135 | 1.0 | 4.0 | 9.5 | 650 |
| Com. Ex. | | | | | | |
| 1 | Ethylene oxide | — | — | 7.8 | 13.0 | 1,850 |
| 2 | Ethylene oxide | Triethyl-amine | 5.0 | 7.0 | 11.5 | 1,250 |
| 3 | Ethylene oxide | Triethyl-amine | 60 | 7.2 | 12.0 | 1,200 |
| 4 | Ethylene oxide | TINUVIN765 | 5.0 | 4.0 | 9.6 | 800 |
| 5 | Ethylene oxide | TINUVIN765 | 0.8 | 7.5 | 12.5 | 1,450 |

*moles per one mole of the catalyst employed

As can be seen from Table 1, the specified alkylated melamine compound used as a catalyst-deactivating agent in the present invention can deactivate more effectively the polymerization catalyst than the prior deactivating agents, and the polyoxymethylene resin obtained by using the melamine compound exhibits higher thermal stability and resistance to depolymerization over those obtained using prior deactivating agents.

While the invention has been described with respect to the specific embodiments, it should be recognized that various modifications and changes may be made by those skilled in the art which also fall within the scope of the invention as defined by the appended claims.

3. The method of claim 1, wherein the comonomer is selected from the group consisting of ethylene oxide, propylene oxide, butylene oxide, phenylene oxide, 1,3-dioxolane, diethyleneglycolformal, 1,3-propanediolformal, 1,4-butanediolformal, 1,3-dioxepaneformal and 1,3,6-trioxocane.

4. The method of claim 1, wherein the alkylated melamine is employed in an amount sufficient to provide one or more nitrogen atoms per mole of the acid catalyst.

5. The method of claim 4, wherein the alkylated melamine is employed in an amount ranging from 0.2 to 50 moles per mole of the acid catalyst.

* * * * *